(12) United States Patent
Mertens

(10) Patent No.: US 6,488,382 B1
(45) Date of Patent: Dec. 3, 2002

(54) EXTERIOR REARVIEW MIRROR FOR VEHICLES, IN PARTICULAR, MOTOR VEHICLES

(75) Inventor: Jens Mertens, Stuttgart (DE)

(73) Assignee: Reitter & Schefenacker GmbH & Co. KG, Esslingen (DE)

( * ) Notice: Subject to any disclaimer, the term of this patent is extended or adjusted under 35 U.S.C. 154(b) by 0 days.

(21) Appl. No.: 09/676,923

(22) Filed: Oct. 2, 2000

(30) Foreign Application Priority Data

Oct. 7, 1999 (DE) ..................... 299 17 714 U

(51) Int. Cl.[7] .............. G02B 7/182; B60R 1/06
(52) U.S. Cl. ............ 359/871; 359/872; 248/475.1; 248/478
(58) Field of Search ............ 359/841, 871, 359/872, 881; 248/475.1, 477, 478

(56) References Cited

U.S. PATENT DOCUMENTS

| | | | | |
|---|---|---|---|---|
| 4,197,762 A | * | 4/1980 | Yamana | |
| 4,234,153 A | * | 11/1980 | Chihara et al. | |
| 4,253,633 A | * | 3/1981 | Takegawa | |
| 4,592,529 A | * | 6/1986 | Suzuki | 248/475.1 |
| 5,061,056 A | * | 10/1991 | You | 359/872 |
| 5,327,294 A | * | 7/1994 | Koske et al. | 248/478 |
| 5,604,645 A | * | 2/1997 | Weaver | |
| 5,629,810 A | * | 5/1997 | Perry et al. | 359/872 |
| 5,639,054 A | * | 6/1997 | Gerndt et al. | 248/478 |
| 5,909,326 A | * | 6/1999 | Leonberger | 359/872 |
| 5,993,017 A | * | 11/1999 | Romas | 359/871 |
| 6,039,449 A | * | 3/2000 | Dolan et al. | 359/871 |

FOREIGN PATENT DOCUMENTS

GB 2049242 * 8/1980

* cited by examiner

Primary Examiner—Ricky D. Shafer
(74) Attorney, Agent, or Firm—Gudrun E. Huckett

(57) ABSTRACT

An exterior rearview mirror for motor vehicles has a mirror support having a first end to be fastened to a motor vehicle and a second end. A mirror head is connected to the second end of the mirror support by a snap connection. The snap connection has at least one catch member provided on a projection of the mirror head. The catch member or members engage a projecting rim of a receptacle provided on the mirror support.

22 Claims, 2 Drawing Sheets

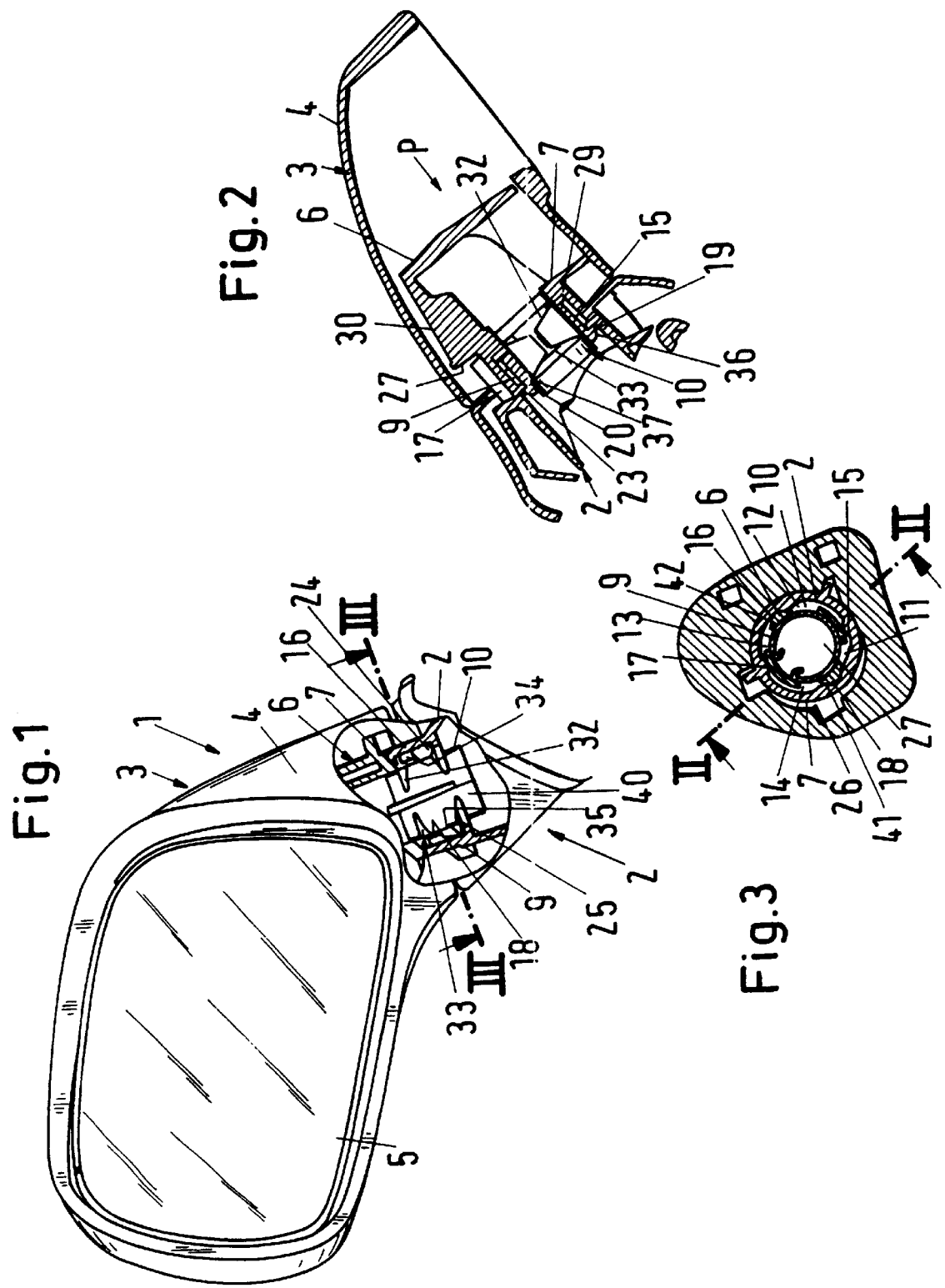

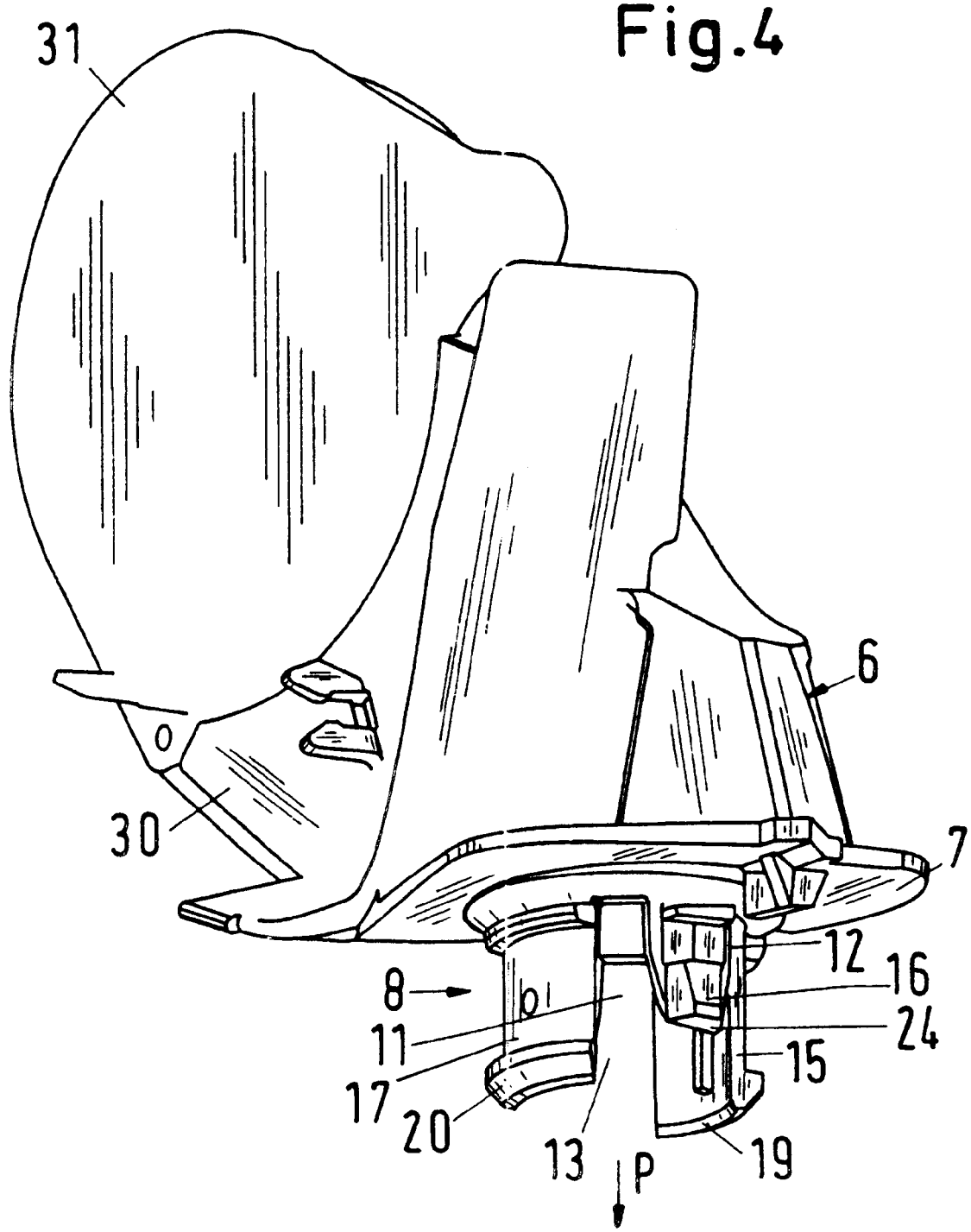

EXTERIOR REARVIEW MIRROR FOR VEHICLES, IN PARTICULAR, MOTOR VEHICLES

BACKGROUND OF THE INVENTION

1. Field of the Invention

The invention relates to an exterior rearview mirror for vehicles, in particular, motor vehicles, comprising a mirror support connected to the vehicle and a mirror head which is connected to the mirror support.

2. Description of the Related Art

Exterior rearview mirrors for motor vehicles are known in which the mirror head is connected to the mirror support by rivets or lock disks. The assembly is cumbersome and time-consuming. Moreover, the connection between the mirror support and the mirror head is complex.

SUMMARY OF THE INVENTION

It is an object of the present invention to develop an exterior rearview mirror of the aforementioned kind such that the mirror head can be safely connected in a constructively simple way to the mirror support.

In accordance with the present invention, this is achieved in that the mirror support is connected to the mirror head by at least one catch member of a snap connection.

Due to the configuration according to the invention, the mirror support and the mirror head are connected by a snap connection. Accordingly, the mirror head and the mirror support can be quickly connected to one another in a constructively simple way.

BRIEF DESCRIPTION OF THE DRAWING

In the drawing:

FIG. 1 is a perspective illustration, partially in section, of a part of the exterior rearview mirror according to the invention comprising a mirror support and a mirror head;

FIG. 2 shows the mirror according to FIG. 1 in a section along the line II—II of FIG. 3;

FIG. 3 is a section along the line III—III of FIG. 1; and

FIG. 4 is a carrier of the mirror head of the exterior rearview mirror according to the invention in a perspective representation.

DESCRIPTION OF THE PREFERRED EMBODIMENTS

The exterior rearview mirror 1 according to the invention, illustrated in FIGS. 1 through 4, comprises a mirror support 2 with which the mirror is connected to a vehicle (not shown). A mirror head 3 is connected to the mirror support 2 and comprises a mirror housing 4 with a housing opening in which a mirror glass or pane 5 is fastened. The mirror housing 4 is arranged on a carrier 6 which is secured in the mirror support by a snap connection. The carrier 6 comprises a projection 8 projecting past the carrier plate 7 (FIGS. 2 through 4) with which it projects into a cylindrical receptacle 9 of the mirror support 2.

In order to prevent an accidental easy rotation of the carrier projection 8 in the receptacle 9, a sleeve-shaped spring 10 is inserted into the projection 8. By means of the spring 10 the projection 8 is radially clamped against the receptacle 9. The projection 8 in the embodiment has four axial stays 15 to 18 which are positioned at a spacing to one another. Between them *lots 11 to 14 (FIG. 3, FIG. 4) are formed, respectively. The stays 15 and 17 or 16 and 18 which are positioned diametrically opposite one another, respectively, are preferably of identical design. The stays 15 and 17 are substantially L-shaped in cross-section and their short legs 36, 37 are provided with locking cams 19, 20 (FIGS. 2 through 4) which project radially outwardly. In cross-section they are substantially trapezoidally shaped and taper in the insertion direction P. The locking cams 19, 20 engage behind a projecting rim 23 at the inner wall 26 of the receptacle 9 (FIG. 2) The stays 16, 18 taper also in the direction P. They have, like the stays 15, 17 (thick ends 29), thick ends 24, 25 with which they can be clamped in the catch position of the mirror head 3 by the spring 10 in a radial direction against the inner wall 26 of the receptacle 9. Moreover, the free ends 24, 25 engage axial depressions 41, 42 (FIG. 3) in the inner wall of the receptacle 9 and thus secure the position of use of the mirror head 3. The stays 16, 18 are somewhat shorter than the stays 15, 17 so that they do not project past the circumferential projecting rim 23 of the receptacle 9.

The free ends 24, 25 of the stays 16, 18 have, in axial section according to FIG. 1, substantially a trapezoidal shape and widen in the insertion direction P (FIG. 4). In the mounted position the free ends 24, 25 of the stays 16, 18 rest with a narrow edge portion 34, 35 on the inner wall 26 of the receptacle 9.

A carrier arm 30 is connected to the carrier plate 7 whose free end is formed as a disc-shaped fastening part 31 on which the drive motor (not shown) for adjusting the mirror glass 5 and the mirror housing 4 is provided. The mirror head 3 and the mirror support 2 are comprised preferably of injection-molded plastic parts.

The spring 10 is comprised preferably of metal and is formed as an open sleeve with preferably diametrically oppositely arranged cutouts 32 and 33. They have approximately an H-shape. The diameter of the spring 10 is slightly greater than the inner diameter of the hollow space 27 surrounded by the stays 15 through 18.

When mounting the exterior rearview mirror, the mirror head 3 is inserted with the axially extending stays 15 through 18, arranged in the circumferential direction of the projection 8, into the receptacle 9 of the mirror support 2. Since the locking cams 19, 20 and the free ends 24, 25 of the stays 15 to 18 taper in the insertion direction P, the stays 15 to 18 can be easily inserted into the receptacle 9. As soon as the locking cams 19, 20 of the stays 15, 17 engage behind the annular rim 23, they spring back radially outwardly and secure thus the mirror head 3 on the mirror support 2. The other stays 16, 18 are positioned with their free ends 24, 25 advantageously with elastic tension at the inner wall 26 of the receptacle 9.

Subsequently, the sleeve-shaped spring 10 is inserted into the hollow space 27 surrounded by the stays 15 to 18. Since the outer diameter of the spring 10 is greater than the inner diameter of the hollow space 27, the spring 10 is elastically compressed in its mounted position. The stays 15 to 18 are thus radially outwardly loaded so that they are resting with a high radial force against the inner wall 26 of the receptacle 9.

The inner sides of the stays 15 to 18 are positioned on a mantle surface of an imaginary cylinder, while the spring 10 has a cylindrical outer surface. Accordingly, the spring 10 rests over its entire surface area against the inner side of the stays 15 to 18. The axial length of the spring 10 is advantageously at least identical to that of the axial length of the stays 15, 17. In the shown embodiment the spring 10 projects with its end 40 axially past the stays 15 to 18.

The spring 10 supports the elastic action of the stays 15 to 18. When the radial clamping force of the stays 15 to 18 decreases due to heat, the spring 10 ensures that the stays will still be pressed with the required force against the inner wall 26 of the receptacle 9. This ensures at all times a safe securing action of the mirror head 3 in the mirror support 2.

It is advantageous when the locking cams 19, 20 and the free ends 24, 25 of the stays 15 to 18 project radially outwardly past the projection 8. This ensures that the lever arm 27 has a relatively large diameter, in particular, since the spring 10 has only minimal thickness. With the thus formed cylindrical large through opening 27 it is easily possible to insert a cable with already attached plug connectors. Since the cable therefore must no longer be threaded through a narrow opening and since furthermore the plug connector must not be mounted after threading of the cable, time and costs for the mirror assembly are saved.

While specific embodiments of the invention have been shown and described in detail to illustrate the inventive principles, it will be understood that the invention may be embodied otherwise without departing from such principles.

What is claimed is:

1. An exterior rearview mirror for motor vehicles, said mirror comprising:

a mirror support (2) having a first end configured to be fastened to a motor vehicle and having a second end;

a mirror head (3) connected to said second end of said mirror support (2) by a snap connection, wherein said snap connection comprises at least one catch member (15, 17);

wherein said mirror head (3) comprises a carrier (6) with a projection (8), wherein said projection (8) is substantially cylindrical;

wherein at least two of said catch members (15, 17) are provided on said projection (8) and are positioned diametrically opposite one another;

wherein said projection (8) has a wall and wherein said catch members (15, 17) form a first wall portion of said wall and form an axial stay, respectively;

wherein between said catch members (15, 17) at least one second wall portion (16, 18) of said wall is positioned, respectively, and wherein said second wall portion is an axial stay;

wherein said first and second wall portions (15–18) are separated from one another by axial slots (11–14);

wherein said at least one second wall portion (16, 18) rests with tension against said second end of said mirror support (2);

wherein said second end of said mirror support (2) has a receptacle (9) and wherein said at least one second wall portion (16, 18) rests against said receptacle (9);

wherein said catch members (15, 17) have free leading ends (19, 20) in a direction of insertion (P) into said receptacle (9) and wherein said free leading ends (19, 20) have radially outwardly projecting locking cams; and wherein said at least one second wall portion (16, 18) widens trapezoidally in said direction of insertion (P) in at least one of a forward direction and a radially outward direction.

2. The mirror according to claim 1, wherein said receptacle (9) has a radially inwardly projecting rim (23) forming a part of said snap connection and wherein said locking cams (19, 20) of said catch members (15, 17) engage behind said projecting rim (23) in said direction of insertion (P).

3. The mirror according to claim 1, wherein said locking cams (19, 20) have a trapezoidal cross-section and taper in said direction of insertion (P).

4. An exterior rearview mirror for motor vehicles, said mirror comprising:

a mirror support (2) having a first end configured to be fastened to a motor vehicle and having a second end;

a mirror head (3) connected to said second end of said mirror support (2) by a snap connection, wherein said snap connection comprises at least one catch member (15, 17);

wherein said mirror head (3) comprises a carrier (6) with a projection (8), wherein said projection (8) is substantially cylindrical;

wherein at least two of said catch members (15, 17) are provided on said projection (8) and are positioned diametrically opposite one another;

wherein said projection (8) has a wall and wherein said catch members (15, 17) form a first wall portion of said wall and form an axial stay, respectively;

wherein between said catch members (15, 17) at least one second wall portion (16, 18) of said wall is positioned, respectively, and wherein said second wall portion is an axial stay;

wherein said first and second wall portions (15–18) are separated from one another by axial slots (11–14);

wherein said at least one second wall portion (16, 18) rests with tension against said second end of said mirror support (2);

wherein said second end of said mirror support (2) has a receptacle (9) and wherein said at least one second wall portion (16, 18) rests against said receptacle (9);

wherein said catch members (15, 17) have free leading ends (19, 20) in a direction of insertion (P) into said receptacle (9) and wherein said free leading ends (19, 20) have radially outwardly projecting locking cams; and wherein said at least one second wall portion (16, 18) has a narrow circumferential edge (34, 35) configured to rest against an inner wall (26) of said receptacle (9).

5. The mirror according to claim 4, wherein said receptacle (9) has a radially inwardly projecting rim (23) forming a part of said snap connection and wherein said locking cams (19, 20) of said catch members (15, 17) engage behind said projecting rim (23) in said direction of insertion (P).

6. The mirror according to claim 4, wherein said locking cams (19, 20) have a trapezoidal cross-section and taper in said direction of insertion (P).

7. An exterior rearview mirror for motor vehicles, said mirror comprising:

a mirror support (2) having a first end configured to be fastened to a motor vehicle and having a second end;

a mirror head (3) connected to said second end of said mirror support (2) by a snap connection, wherein said snap connection comprises at least one catch member (15, 17);

wherein said mirror head (3) comprises a carrier (6) with a projection (8), wherein said projection (8) is substantially cylindrical;

wherein at least two of said catch members (15, 17) are provided on said projection (8) and are positioned diametrically opposite one another;

wherein said projection (8) has a wall and wherein said catch members (15, 17) form a first wall portion of said wall and form an axial stay, respectively;

wherein between said catch members (15, 17) at least one second wall portion (16, 18) of said wall is positioned, respectively, and wherein said second wall portion is an axial stay;

wherein said first and second wall portions (15–18) are separated from one another by axial slots (11–14); and further comprising at least one spring (10) configured to load at least said catch members (15, 17) of said projection (8) in a radially outward direction.

8. The mirror according to claim 7, wherein said at least one second wall portion (16, 18) rests with tension against said second end of said mirror support (2).

9. The mirror according to claim 8, wherein said second end of said mirror support (2) has a receptacle (9) and wherein said at least one second wall portion (16, 18) rests against said receptacle (9).

10. The mirror according to claim 9, wherein said catch members (15, 17) have free leading ends (19, 20) in a direction of insertion (P) into said receptacle (9) and wherein said free leading ends (19, 20) have radially outwardly projecting locking cams.

11. The mirror according to claim 10, wherein said receptacle (9) has a radially inwardly projecting rim (23) forming a part of said snap connection and wherein said locking cams (19, 20) of said catch members (15, 17) engage behind said projecting rim (23) in said direction of insertion (P).

12. The mirror according to claim 10, wherein said locking cams (19, 20) have a trapezoidal cross-section and taper in said direction of insertion (P).

13. The mirror according to claim 10, wherein said at least one second wall portion (16, 18) widens trapezoidally in said direction of insertion (P) in at least one of a forward direction and a radially outward direction.

14. The mirror according to claim 7, wherein said at least one spring (10) is configured to load also said at least one second wall portion (16, 18) in said radially outward direction.

15. The mirror according to claim 7, wherein said at least one spring (10) is positioned in said projection (8).

16. The mirror according to claim 15, wherein said at least one spring (10) is an annular spring.

17. The mirror according to claim 15, wherein said at least one spring (10) is an open sleeve.

18. The mirror according to claim 15, wherein said at least one spring (10) has at least one cutout (32, 33).

19. The mirror according to claim 18, wherein said at least one spring (10) has two of said cutouts (32, 33) positioned diametrically opposite one another.

20. The mirror according to claim 15, wherein said at least one spring (10) has a leading end (40) in said direction of insertion (P) and wherein said leading end (40) projects axially past said projection (9).

21. The mirror according to claim 20, wherein said carrier (6) consists of plastic material.

22. The mirror according to claim 15, wherein said at least one spring (10) is a metal spring.

* * * * *